United States Patent [19]
Collas et al.

[11] Patent Number: 5,996,474
[45] Date of Patent: Dec. 7, 1999

[54] ELECTRIC COOKING APPLIANCE COMPRISING A DEVICE FOR CONDENSING COOKING VAPORS

[75] Inventors: Guy Collas, Ifs; Jean Lereverend, Caen, both of France

[73] Assignee: Moulinex S.A., Paris, France

[21] Appl. No.: 09/284,835

[22] PCT Filed: Oct. 15, 1997

[86] PCT No.: PCT/FR97/01837

§ 371 Date: Apr. 21, 1999

§ 102(e) Date: Apr. 21, 1999

[87] PCT Pub. No.: WO98/17162

PCT Pub. Date: Apr. 30, 1998

[30] Foreign Application Priority Data

Oct. 21, 1996 [FR] France .................................. 96 12767

[51] Int. Cl.[6] .............................. A47J 36/38; A47J 37/12
[52] U.S. Cl. ................................. 99/337; 99/330; 99/403; 55/DIG. 36; 126/299 D; 126/391; 210/167; 210/DIG. 8
[58] Field of Search ............................. 99/330, 337, 338, 99/403–418; 126/299 D, 299 E, 391; 55/315, 309.1, DIG. 36; 210/167, DIG. 8, 184, 187

[56] References Cited

U.S. PATENT DOCUMENTS

| | | |
|---|---|---|
| 4,505,193 | 3/1985 | Mariotti ..................................... 99/330 |
| 4,530,717 | 7/1985 | Bohrer, Jr. et al. ................ 55/DIG. 36 |
| 4,539,898 | 9/1985 | Bishop et al. ............................. 99/407 |
| 4,668,390 | 5/1987 | Hurley et al. ............................ 210/167 |
| 4,995,312 | 2/1991 | Leiros ....................................... 99/411 |
| 5,165,329 | 11/1992 | Jacob et al. ............................... 99/407 |
| 5,297,474 | 3/1994 | Tabuchi ............................. 210/DIG. 8 |
| 5,367,949 | 11/1994 | Nitschke et al. .................... 55/DIG. 36 |
| 5,379,684 | 1/1995 | Ettridge ..................................... 99/413 |
| 5,452,648 | 9/1995 | Hohler et al. ............................. 99/408 |
| 5,584,234 | 12/1996 | Baillieul et al. .......................... 99/403 |
| 5,613,424 | 3/1997 | Chameroy et al. ....................... 99/337 |
| 5,839,357 | 11/1998 | Ha et al. ................................... 99/337 |

FOREIGN PATENT DOCUMENTS

| | | |
|---|---|---|
| 0 067 730 | 12/1982 | European Pat. Off. . |
| 0 730 838 | 9/1996 | European Pat. Off. . |
| 2 266 654 | 11/1993 | United Kingdom . |
| WO 91/04698 | 4/1991 | WIPO . |
| WO 94/23626 | 10/1994 | WIPO . |

Primary Examiner—Timothy Simone
Attorney, Agent, or Firm—Young & Thompson

[57] ABSTRACT

The invention concerns a cooking appliance comprising an external housing (3) in which are incorporated a vessel (12), device (14) for electrically heating the vessel, and a box (23) housing a removable device (25) for condensing vapors urged to be connected on operating device (27) communicating with the vessel. The appliance comprises sensing device (65) for sensing the presence of the condensing device (25) in the box (23) and actuated by the condensing device (25) when it is present in the box (23), and a switch (68) whose control capable of closing the power circuit supplying the heating device is dependent on the actuating of the sensing device (65).

9 Claims, 4 Drawing Sheets

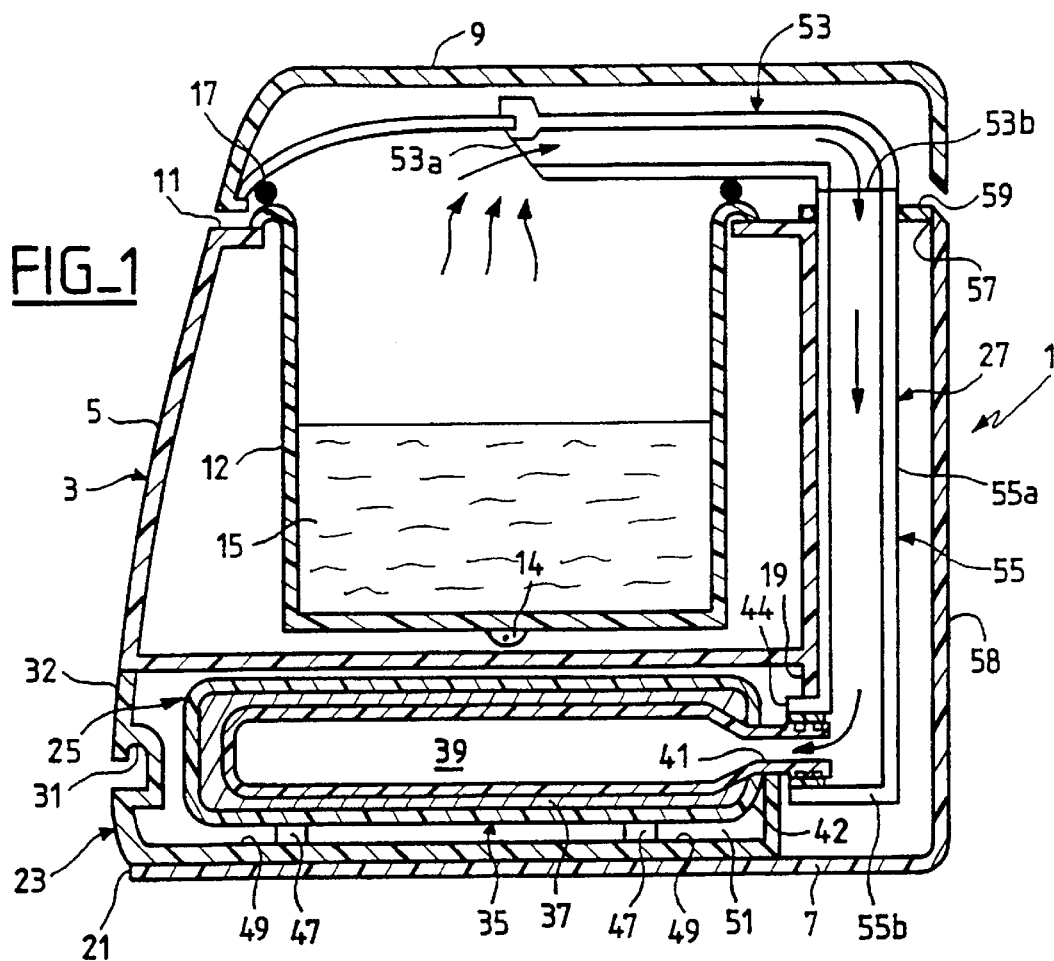
FIG_1
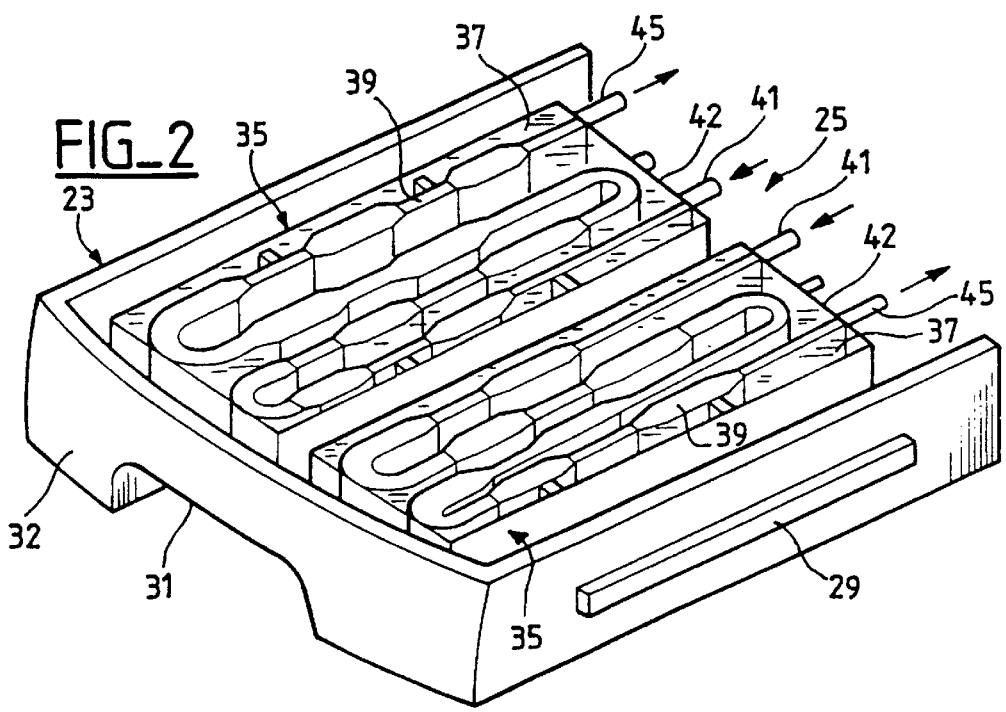
FIG_2

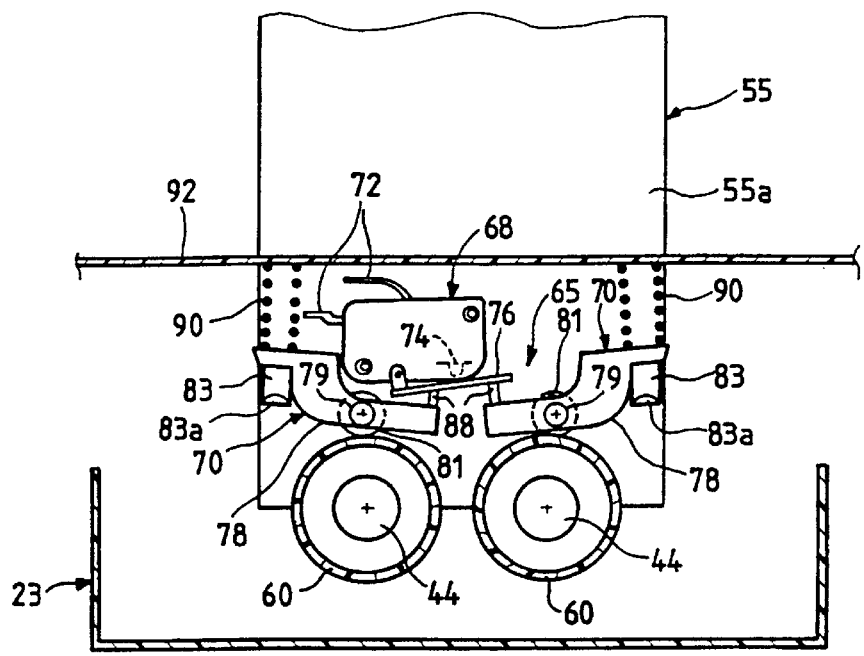
FIG_3
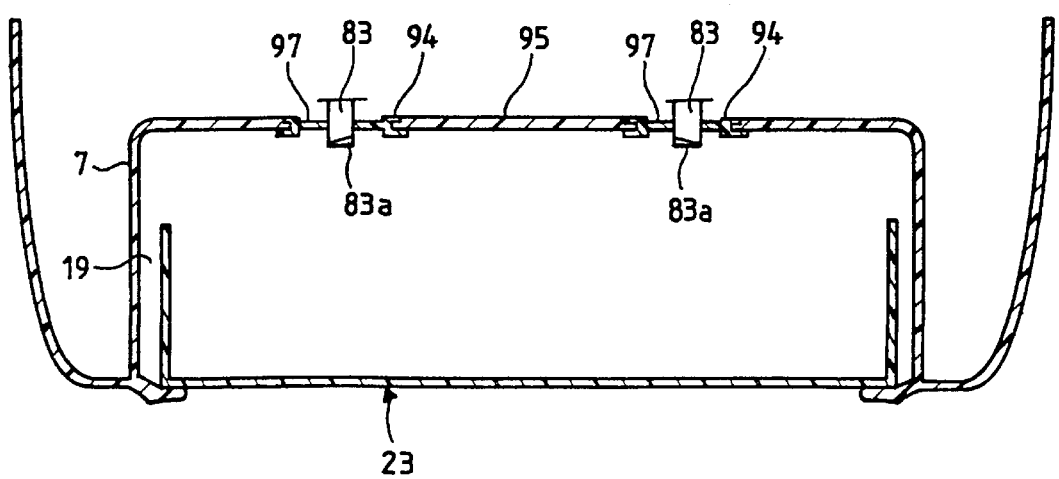
FIG_4

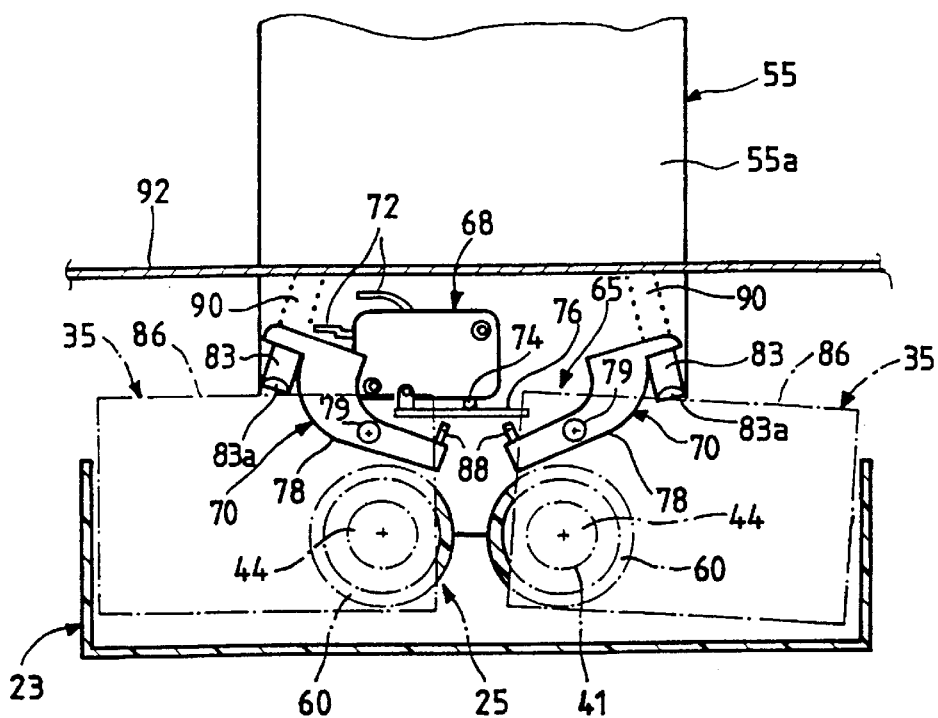
FIG_5
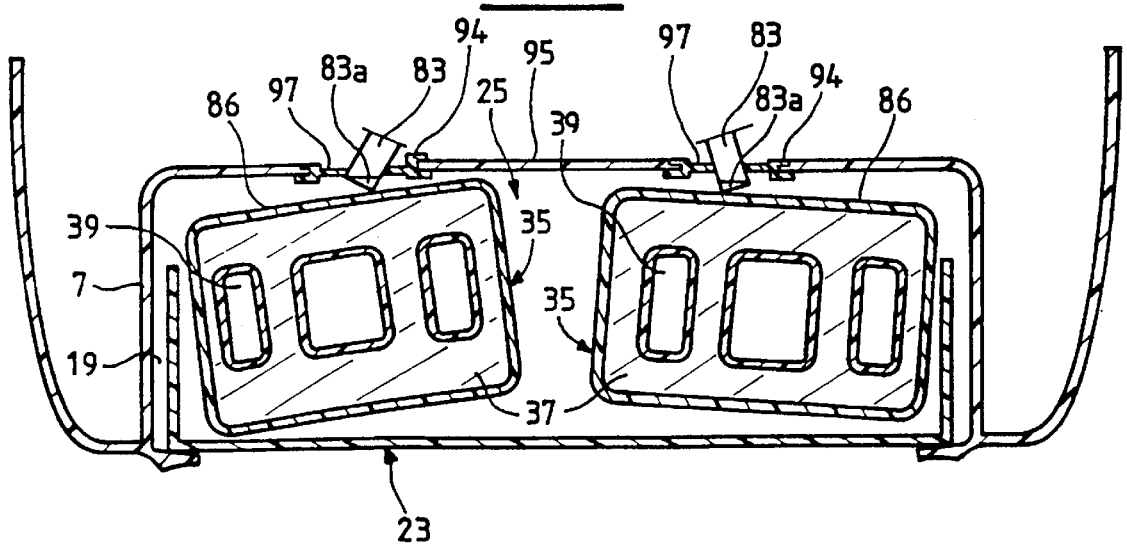
FIG_6

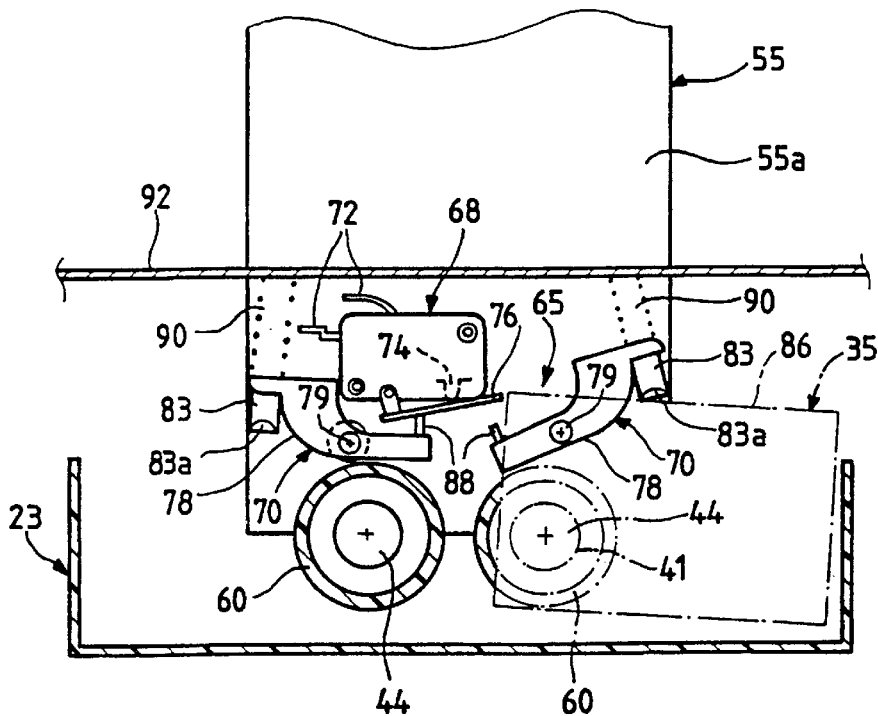
FIG_7
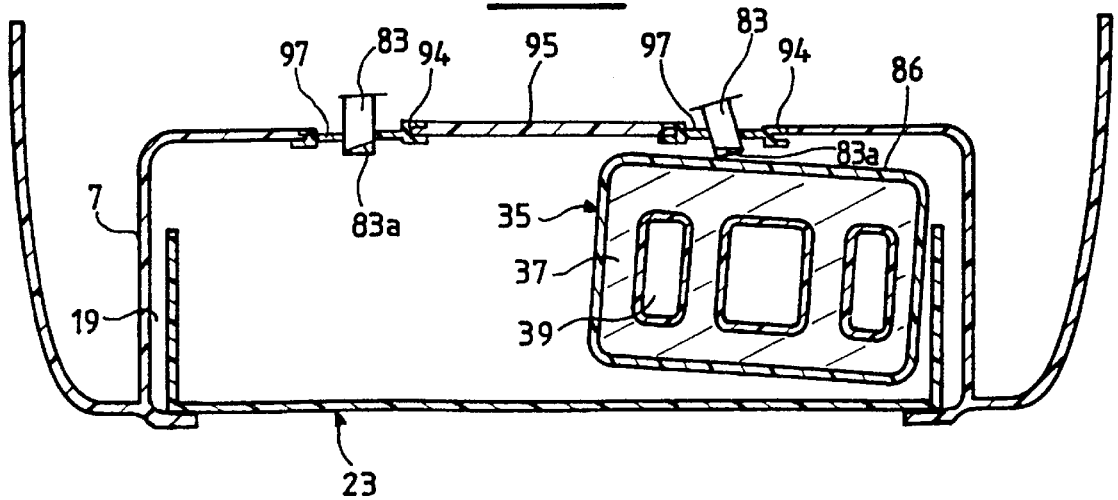
FIG_8

ELECTRIC COOKING APPLIANCE COMPRISING A DEVICE FOR CONDENSING COOKING VAPORS

The present invention relates to electrical cooking apparatus, such as for example deep fat fryers for household use, which comprise an external casing in which are incorporated a cooking vat, electrical heating means in heat exchange relation with the vat, and a pan housing a removable device for condensation of the cooking vapors which is adapted to be connected to conduit means communicating with the vat and permitting the flow of cooking vapors.

It is known that for such cooking apparatus, the use of a condensation device is particularly efficacious to eliminate the vapors containing bad-smelling substances emitted in the course of cooking.

In known cooking apparatus of this type, it has already been proposed to use a pan, for example removable, in the form of a drawer in which is removably mounted the condensation device, of the heat exchange type, and which is inserted in a compartment provided in a base forming an integral part of the casing of the apparatus. During use of the apparatus, the user can correctly place the pan in the base of the casing without the condensation device having been mounted in the vat, then start the cooking operation. Thereafter, in the course of cooking, the bad-smelling substances in the vapors are no longer eliminated, so that the apparatus particularly loses its usefulness. Moreover, the vapors which are given off flow into the vat in which they can create an abnormal overpressure which is particularly dangerous.

The invention particularly has for its object to overcome these drawbacks and to provide an electrical cooking apparatus, of the type described above, which will be provided with a safety device permitting the operation of the apparatus only when the condensation device is mounted in the pan.

According to the invention, the apparatus comprises detection means adapted to detect the presence of the condensation device in the pan and adapted to be actuated by said condensation device when this latter is present in the pan, and a safety switch arranged in the electrical supply circuit of the heating means and whose control permitting closing said electrical supply circuit is subordinated to the actuation of said detection means.

Thus, it will be understood that to obtain reliable operation of the cooking apparatus, the presence of the condensation device in the pan is necessary to supply the electrical heating means, thereby permitting providing an apparatus having optimum guarantee of the safety of the user.

In a particular embodiment of the removable condensation device, of the type comprising at least two refrigerating cassettes hermetically removably mounted in the pan and each having an inlet for vapors to be condensed which is adapted to connect with a corresponding opening provided in the outlet of the conduit means, and an outlet opening into the cassette and through which flows condensation water produced by passage of the vapors into said cassette, and according to another characteristic of the invention, the detection means are adapted to control the safety switch, so as to close the electrical supply circuit of the heating means, only when all the cassettes of the condensation device are present in the pan.

The characteristics and advantages of the invention will become further apparent from the description which follows, by way of non-limiting example, with reference to the accompanying drawings, in which:

FIG. 1 is a schematic view in vertical cross-section of an electrical cooking apparatus, such as a deep fat fryer, comprising a removable pan containing a condensation device with hermetic refrigerant cassettes and being correctly in place in the apparatus;

FIG. 2 is a schematic perspective view, on an enlarged scale, of the removable pan of the apparatus of FIG. 1, in which is mounted the condensation device comprising two refrigerating cassettes;

FIGS. 3 and 4 are schematic views partially in cross-section, on different vertical planes, showing respectively a safety device according to the present invention (3) and the pan mounted in the apparatus (4), when no cassette is present in the pan;

FIGS. 5 and 6 are views similar to FIGS. 3 and 4, respectively, when the two cassettes are present in the pan; and FIGS. 7 and 8 are views similar to FIGS. 3 and 4, respectively, when a single one of the two cassettes is present in the pan.

The electrical cooking apparatus 1 shown schematically in FIG. 1 is a household electric deep fat fryer which comprises an external casing 3, of generally substantially parallelepipedal shape, formed by an open receptacle 5, a base 7 forming an integral part of the receptacle 5, at the base of this latter, and a cover 9 adapted to close, during frying, the receptacle 5 and being mounted pivotally in a removable fashion on an upper edge 11 of the receptacle by disassembable articulation means (not shown).

The assembly formed by the receptacle 5 and the base 7, on the one hand, and the cover 9, on the other hand, is molded from a plastic material such as for example polypropylene, which is particularly economical and easy to work with.

As to FIG. 1, a metallic vat 12 is disposed in the receptacle 5, is in heat exchange relation with electrical heating means, such as a shielded resistance 14, and contains a frying bath 15. The cover 9 comprises on its internal surface a joint 17 so shaped as to seal between the vat 12 and the cover 9 when this latter is closed, as shown in FIG. 1.

In the embodiment illustrated in FIG. 1, in the base 7 of the casing 3, is provided a recess 19 which opens through the front surface 21 of the base and in which is mounted a pan 23, better shown in FIG. 2, which, in this example, is removable, and receives a removable device for condensation of vapor, designated by overall reference numeral 25 in FIGS. 1 and 2, and which is adapted, when the pan 23 is correctly in place in the recess 19 in the base, to connect with conduit or connection means 27 communicating with the vat 12 and permitting the flow of cooking vapors.

In this embodiment, FIGS. 1 and 2, the removable pan 23 is shaped as a drawer of parallelepipedal shape, open at its rear region and at its upper region, and is horizontally slidably mounted in the recess 19 of the base 7 on two longitudinal rails 29, of which only one is visible in FIG. 2, engaging in two corresponding slideways (not shown) provided respectively on the two sidewalls of the recess 19. In FIGS. 1 and 2, there is shown at 31 a large slot provided in the front surface 32 of the pan 23 and forming a gripping member for withdrawing the pan.

In this example, FIGS. 1 and 2, the removable condensation device 25 comprises at least two identical hermetic refrigerant cassettes 35, here two in number, of parallelepipedal shape, which are removably mounted in the pan 23 and extend in the same longitudinal direction, substantially over all the length of the pan 23, and parallel to each other. Each of the two cassettes 35 is preferably of a transparent plastic material, containing a refrigerant agent 37 constituted in this instance by frozen water, if desired colored by a non-toxic colorant, and houses an internal conduit 39 serving as a condensing channel. This conduit 39, FIG. 2, is in this instance of serpentine shape having, on the one hand, an inlet 41 for introduction of the vapors to be condensed which projects axially from the rear surface 42 of the cassette 35, and which is adapted, when the pan 23 is correctly in place in the recess 19 of the base 7, to couple directly in a sealed manner with a corresponding opening 44 provided as an outlet of the conduit means 27 (see FIG. 1), and on the other hand, an outlet 45 which also projects axially from the rear surface 42 of the cassette and through which is adapted to flow condensation water produced by the passage of the vapors through the conduit 39 cooled by the ice.

As shown in FIG. 2, one of the two cassettes 35 is mounted reversed relative to the other cassette so as to place side by side the two vapor inlets 41, which reduces the size at the level of the two openings 44 provided on the conduit means 27 and on which are adapted to be directly connected these two inlets 41 of the cassettes, respectively. The two refrigerating cassettes 35 with internal conduit 39 rest on two cross-pieces 47 (FIG. 1) surmounting the bottom wall 49 of the pan 23 so as to create a lower region 51 adapted to collect the condensate flowing from the outlet 45 of each conduit 39. Preferably, the two cassettes 35 are slightly inclined, respectively, toward the two longitudinal surfaces of the pan 23, as shown in FIG. 6, so as to facilitate the flow of condensate through the outlet of each internal conduit 39.

In the embodiment shown in FIG. 1, the means 27 for conducting the cooking vapors between the vat 12 and each of the two cassettes 35 mounted in the pan 23, this latter being correctly in place in the recess 19 of the base 7, comprise a first conduit 53 which is integrated into the cover 9 of casing 3 and whose one end 53a opens into the upper volume of the vat 12, and a second conduit 55 which extends vertically in a transverse opening 57 provided in the receptacle 5, from the upper edge 11 of its rear surface 58; the conduit 55 has a joint 59 adapted to ensure sealing at the level of the opening 57. The conduit 55 has an L-shape cross-section whose vertical leg 55a passes through the opening 57 and is connected sealingly to the other end 53b of the conduit 53, and whose horizontal leg 55b opens, through two openings 44 located beside each other (see FIGS. 3, 5 and 7), into the rear portion of the recess 19. Each of the two openings 44 of the conduit 55 comprises a sealing joint 60 (see FIGS. 3, 5 and 7) on which is directly connected the inlet 41 of the internal conduit 39 of each of the two refrigerating cassettes 35, which inlet 41 of the conduit 39 is preferably provided also with a sleeve forming a sealing joint.

According to the invention, with reference to FIGS. 3, 5 and 7, the deep fat fryer comprises moreover detection means, designated by the overall reference numeral 65, adapted to detect the presence of the condensation device 25, here constituted by the two removable refrigerating cassettes 35 with internal conduit 39, in the removable pan 23 when this latter is correctly in place in the casing 3, in this case in the recess 19 of the base 7 (see FIGS. 4, 6 and 8), and which are adapted to be actuated by the condensation device 25 when this latter is present in the pan 23, and a safety switch 68 arranged in the electrical supply circuit of the heating resistance 14 (FIG. 1) and whose control permitting closing the electrical supply circuit is subordinated to the actuation of detection means 65.

Thus, thanks to this arrangement, there is obtained a safety device for the operation of the deep fat fryer because the switch 68 cannot be actuated other than by detection means 65 whose actuation itself is subject to the presence of the condensation device 25 in the pan 23.

For the embodiment described above concerning the condensation device 25, which comprises, by way of pure illustration but in no way limiting, two refrigerating cassettes 35 with an internal conduit 39, the detection means 65 are adapted to control the safety switch 68, so as to close the electrical supply circuit of the heating resistance 14 only when the two cassettes 35 are present in the removable pan 23, this latter being in correct position in the recess 19 of the base 7 of the deep fat fryer.

Within the scope of the condensation device 25 with two refrigerating cassettes 35, the detection means 65 now comprise two identical actuating members, each designated 70 in FIGS. 3, 5 and 7, which are actuated each by one of the cassettes when the latter is present in the pan 23, and which permit control of the switch 68 to close the electrical supply circuit of the heating resistance 14 only when both are actuated.

In the embodiment shown in FIGS. 3, 5 and 7, the safety switch 68 is of the normally open type in rest position by being electrically connected to the supply circuit of the heating resistance via connection terminals 72, and is fixed on the external wall of the vertical leg 55a of the conduit 55, adjacent the base of the latter. The switch 68 comprises a control button 74 and a flexible metallic blade 76 which is fixed, at one of its ends, on the body of the switch, and which co-acts with the button 74.

In this example, FIGS. 3, 5 and 7, each of the two actuating members 70 comprises a swinging lever 78 having an axis of articulation 79 mounted in a bearing 81 (FIG. 3) secured to the external wall of the vertical leg 55a of the conduit 55, and comprising an end portion bent at a right angle toward the front of the pan and which carries an actuating finger 83 downwardly directed and adapted to come into contact with the upper surface 86 (FIGS. 5, 6, 7 and 8) of the corresponding cassette 35 when this latter is mounted in the pan 23. At its end opposite the actuating finger 83, the lever 28 has at right angles a tongue 88 directed upwardly and adapted, as will be seen later, to be associated or disassociated with the blade 76 of the switch 68. The lever 78 is connected to a coil compression and return spring 90 which is interposed between a bearing surface 92 provided in the receptacle 5 of the casing of the deep fat fryer and the upper surface of the lever 78, at the level of its actuating finger 83.

Preferably, the assembly formed by the lever 78, the articulation axle 79, the actuating finger 83 and the tongue 88, is molded from a single piece of plastic material.

As shown in FIGS. 4, 6 and 8, the free end 83a of each of the two actuating fingers 83, on the one hand, projects into the recess 19 of the base 7 by a passage through an opening 94 provided in the upper wall 95 of the base 7 and in which is mounted a sealing joint 97, and on the other hand, is beveled so as to promote the swinging of the lever 78 when the finger 83 is actuated by the corresponding cassette.

As to FIGS. 3 and 4, the two levers 78 occupy a rest position when neither of the two cassettes is present in the pan 23, and in which, under the actuation of their return spring 90, the tongue 88 of each lever 78 bears against the blade 76 of the switch maintaining it under pressure so as to maintain pressed in the button 74 of the switch 68, as shown in broken lines in FIG. 3. This pressing in of the button 74 places the switch 68 in its rest position in which it is normally open, and the open switch 68 hence causes the opening of the electrical supply circuit of the heating resistance 14, thereby preventing operation of the deep fat fryer.

From their rest position shown in FIG. 3, the two levers 78 are adapted to occupy by swinging a working position, shown in FIGS. 5 and 6, when the two cassettes 35 are present in the removable pan 23. Thus, upon correct emplacement of the pan 23 containing the two cassettes 35 in the recess 19 of the base 17, the inlet 41 of the internal conduit 39 of each of the two cassettes will connect directly in a sealed manner with the corresponding opening 44 of the conduit 55 (FIG. 5) and, almost simultaneously, the beveled end 83a of the actuating finger 83 of each of the two levers 78 is actuated by the upper surface 86 of the corresponding cassette 35 (FIG. 6). This actuation of the two fingers 83 gives rise to swinging of the two levers 78 in opposite directions from each other, under the return force of their respective spring 90, such that the two tongues 88 of the levers are disassociated from the blade 76, which thus is freed and which brings about the release of the button 74 of the switch 68, as shown in FIG. 5. This release of the button 74 causes closing of the switch 68, which switch therefore causes the closing of the electrical supply circuit of the heating resistance 14, thereby permitting the operation of the deep fat fryer.

Then, in the course of frying, the evacuation and elimination of the vapors present in the fryer takes place in the following manner, with reference to FIGS. 1 and 2.

The vapors (shown by arrows) which are given off and which contain the bad-smelling substances, escape through the conduit 53, flowing downwardly in conduit 55 and enter, via each of the two inlet openings 44, the corresponding inlet 41 of the serpentine conduit 39 of each of the two refrigerating cassettes 35. They then circulate in each conduit 39 and condense in the latter which is cooled by frozen water 37; the water of condensation containing bad-smelling substances flows through the outlet 45 of each conduit 39 and falls into the collecting region 51 of the pan 23.

Referring now to FIGS. 7 and 8, there will be described the operation of the safety device in case a single one of the two cassettes 35, for example that at the right of FIG. 8, is present in the removable pan 23. Upon correct emplacement of the pan 23 containing the single cassette 35 in the recess 19 of the base 7, the inlet 41 of the internal conduit 39 of the cassette 35 becomes directly connected in a sealed manner to the corresponding opening 44 of the conduit 55 (FIG. 7), and almost simultaneously, the beveled end 83a of the actuating finger 83 of the corresponding lever 78 is actuated by the upper surface 86 of the cassette 35 (FIG. 8). This actuation of the finger 83 gives rise to a counter-clockwise swinging of the lever 78, against the return force of its spring 90, which thus comes to occupy an active position in which its tongue 88 is disassociated or disengaged from the blade 76 of the switch 68, see FIG. 7. On the contrary, the other lever 78 whose finger 83 is not actuated because of the absence of the other cassette, remains in its rest position in which, under the action of its return spring 90, its tongue 88 maintains pressure against the blade 76, which maintains the button 74 of the switch 68 pushed in, as is seen in FIG. 7. This pushing in of the button 74 maintains the switch 88 in its rest position in which it is normally open, which open switch therefore causes the opening of the electrical supply circuit of the heating resistance 14, thereby preventing operation of the deep fat fryer.

Of course, the invention is not limited to the embodiment which has been described. It is applicable also to any other type of condensation device which is removably mounted in a pan, which pan can also be mounted fixedly in the casing of the cooking apparatus.

We claim:

1. Electric cooking apparatus, such as for example a deep fat fryer, comprising an external casing (3) in which are incorporated a cooking vat (12), electric heating means (14) in heat exchange relation with the vat, and a pan (23) containing a removable device (25) for condensation of the cooking vapors which is adapted to be connected to conduit means (27) communicating with the vat and permitting the flow of cooking vapors, characterized in that it comprises detection means (65) adapted to detect the presence of the condensation device (25) in the pan (23) and adapted to be actuated by said condensation device (25) when this latter is present in the pan (23), and a safety switch (68) arranged in the electrical supply circuit of the heating means (14) and whose control permitting the closing of said electrical supply circuit is dependent on the actuation of said detection means (65).

2. Electric cooking apparatus according to claim 1, in which the removable condensation device (25) comprises at least two hermetic refrigerant cassettes (35) mounted removably in the pan (23) and each having an inlet (41) for the supply of vapors to be condensed, which is adapted to couple on a corresponding opening (44) provided on the outlet of the conduit means (27), and an outlet (45) opening from the cassette (35) and through which flows the water of condensation produced by passage of the vapors into this cassette, characterized in that so as to close the electrical supply circuit of the heating means (14), the detection means (65) are adapted to control the safety switch (68) only when all the cassettes (35) of the condensation device are present in the vat (23).

3. Electric cooking apparatus according to claim 2, characterized in that the detection means (65) comprise at least two actuating members (70) which are each actuated by one of the cassettes (35) when the latter is present in the pan (23), said actuating members (70) permitting the control of the switch (68) to close the electrical supply circuit of the heating means only when they are all actuated.

4. Electric cooking apparatus according to claim 3, in which the refrigerating cassettes (35) are two in number and the conduit means (27) comprise at least one conduit (55) terminating in two openings (44) to which are adapted to be coupled, respectively, the two inlets (41) of the refrigerating cassettes, characterized in that the safety switch (68) is fixed on said conduit (55) and comprises a control button (74) and a flexible blade (76), fixed at one of its ends on said switch and co-acting with said button (74), and the two actuating members (70) comprise respectively two swinging levers (78) of which each is mounted articulatedly on a bearing (81) secured to the conduit (55), and is associated with a return spring (90), and comprises, at one of its ends, an actuating finger (83) adapted to come into contact with the corresponding cassette and, at its other end, a tongue (88) associated with said blade (76) of the switch, these two levers (78), on the one hand, occupying a rest position when none of the two cassettes (35) is present in the pan (23), and in which, under the action of their respective return spring, their respective tongue (88) maintains pressure on said blade (76) to maintain pushed in the button (74) of the switch so as to open the electrical supply circuit of the heating means, and on the other hand, being displaced by the return force of their respective return spring, either both when the two cassettes (35) are present in the pan (23), toward a working position in which their respective actuating finger (83) is actuated by the corresponding cassette (35) and their respective tongue (88) frees said blade (76) to release the button (74) of the switch so as to close the electrical supply circuit of the heating means, or a single one of them when a single one of the two cassettes (35) is present in the pan (23), the moved lever (78) coming to occupy an active position in which its actuating finger (83) is actuated by the cassette (35) and its tongue (88) is separated from said blade (76), whilst the other lever (78) remains in its rest position in which its tongue (88) maintains under pressure said blade (76) to maintain the button (74) of the switch pushed in, such that the electrical supply circuit of the heating means is open.

5. Electric cooking apparatus according to claim 4, in which the pan (23) is removable and mounted horizontally slidable in a recess (19) provided in a base (7) forming an integral part of the casing, and the conduit (55) extends vertically in the casing and opens, through its two openings (44), into the rear portion of said recess (19), characterized in that the free end (83a) of the actuating finger (83) of each lever (78) projects into said recess (19) by passage through an opening (94) provided in the upper wall (95) of the base (7) and in which is mounted a sealing joint (97).

6. Electric cooking apparatus according to claim 5, characterized in that the free end (83a) of the actuating finger (83) of each lever (78) is bisected so as to promote the swinging of the lever when said finger (83) is actuated by the corresponding cassette (35), the pan (23) being correctly in place in the casing.

7. Electric cooking apparatus according to claim 4, characterized in that each assembly formed by the lever (78), the actuating finger (83) and the tongue (88), is molded from a single piece of plastic material.

8. Electric cooking apparatus according to claim 5, characterized in that each assembly formed by the level (78), the actuating finger (83) and the tongue (88), is molded from a single piece of plastic material.

9. Electric cooking apparatus according to claim 6, characterized in that each assembly formed by the level (78), the actuating finger (83) and the tongue (88), is molded from a single piece of plastic material.

* * * * *